United States Patent Office 3,380,407
Patented Apr. 30, 1968

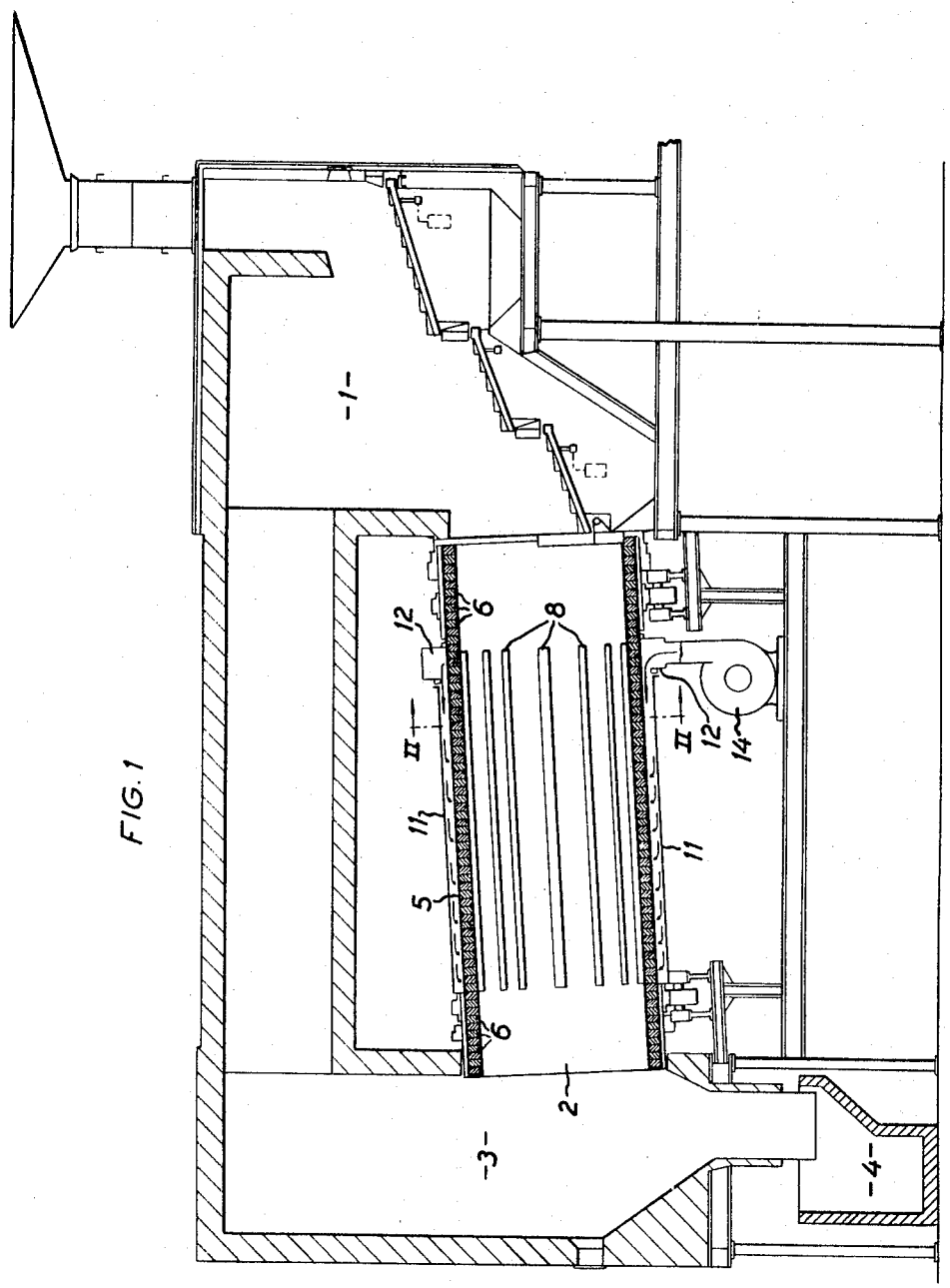

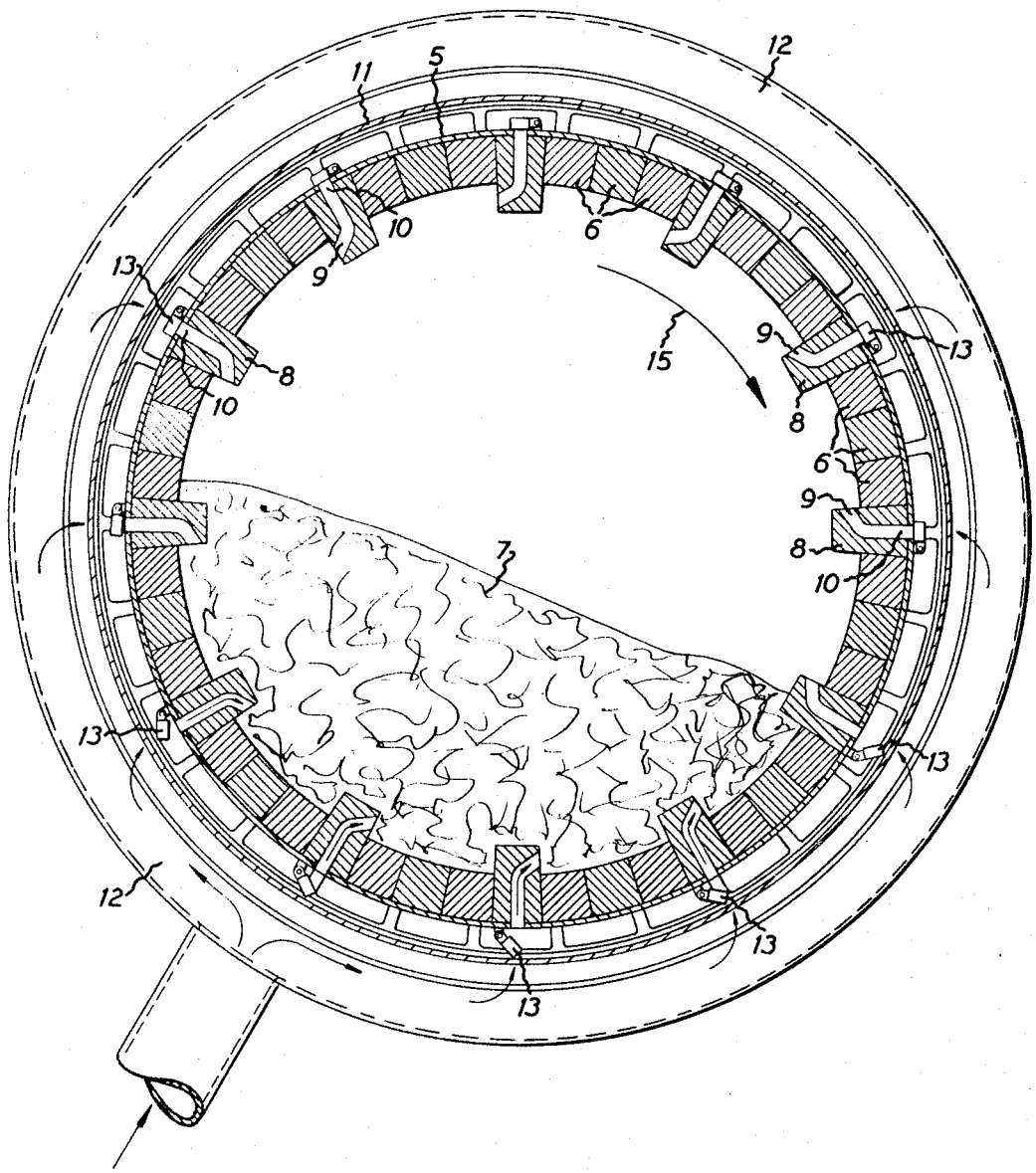

3,380,407
ROTARY INCINERATORS FOR WASTE AND REFUSE MATTER
Nils Fredrik Nilsson, Landskrona, Sweden, assignor to Aktiebolaget Landsverk, Landskrona, Sweden
Filed Sept. 2, 1966, Ser. No. 576,956
Claims priority application Sweden, Sept. 15, 1965, 11,994/65
2 Claims. (Cl. 110—14)

ABSTRACT OF THE DISCLOSURE

A rotary incinerator having an inlet and outlet at its opposite ends, and spaced inner and outer shells defining an air space. The inner shell has a refractory brick lining including a number of longitudinally extending brick layers which project inwardly into the combustion chamber beyond the remaining bricks at spaced intervals around the lining to define ribs for enhancing intermixture and revolution of the refuse matter. Discharge passages are provided in the ribs for introducing air into the combustion chamber from the air space between the shells. Flap valves are provided in the air space to control the flow of air through the discharge passages; the flap valves being movable outwardly to fully open the discharge passages when the flap valves are located in the lower section of the incinerator during rotation, and inwardly to partially close the air discharge passages when in the upper sector.

This invention relates to rotary incinerators for such waste and other refuse mater as is considered difficult to incinerate, wherein the incinerator unit is kept slowly rotating during operation and the matter is fed into the incinerator unit at one end thereof, while flue gases and solid combustion residues are discharged from the unit at the other end thereof, and the shell of the incinerator unit is provided internally with a refractory brick lining which in a lower sector of the rotating incinerator constitutes a hearth for the waste and refuse matter and in an upper sector a roof over the hearth and the burning waste and refuse matter thereon.

According to the invention, the refractory lining bricks in substantially longitudinal brick layers distributed at spaced intervals around the inner circumference of the incinerator project towards the centre of the incinerator beyond the other bricks of the refractory lining and constitute on the one hand pushing ribs or blades internally of the incinerator, said ribs or blades promoting the intermixture and revolution of the matter on the hearth, and on the other hand air supply nozzles adapted for preferably forced supply to the combustion chamber of both primary air through the hearth and secondary air through the roof. The air passages in the bricks constituting pushing ribs or blades and air supply nozzles open into the combustion chamber preferably on the back of the rib or blade forming portions of these bricks, as seen in the contemplated direction of rotation of the incinerator, more or less closely tangentially to the circumference of the combustion chamber opposite to the contemplated direction of rotation of the incinerator. The incinerator shell having the refractory brick lining can be surrounded in a known manner by an outer shell partaking in the rotation of the incinerator and forming interstices between the shells with connections for means for forced supply of air, and may preferably be provided with air discharge holes so arranged in relation to the bricks constituting pushing ribs or blades and air supply nozzles internally of the incinerator, that each of the air passages in these bricks directly connects one of said air discharge holes. All or some of the air discharge holes in the incinerator shell having the refractory brick lining can extend from a continuous air supply space between said shell and the outer shell and be controlled by valves associated with said holes in said space and preferably having the form of flaps pivotally mounted so as to swing outwards by gravity during the rotation of the incinerator keeping the air discharge holes fully open within the hearth-forming lower sector of the rotary incinerator and so as to swing inwards incompletely closing the air discharge holes within the roof forming upper sector of the rotary incinerator. Alternatively, the space between the two incinerator shells may be divided throughout the length thereof or along one or more parts thereof into supply passages for the air to the air supply nozzles by substantially longitudinal partitions, each of said air supply passages being associated with one of the brick layers constituting the pushing ribs or blades and the air supply nozzles internally of the incinerator. Individually controllable separate air supply means may be provided for the forced supply of air to said passages within the hearth-forming lower sector of the rotary incinerator and the roof-forming upper sector thereof.

The rotary incinerator according to the present invention makes it possible to utilize a particularly advantageous method of operating the incinerator which is part of the invention and consists in supplying the air to the air supply nozzles in a larger amount and possibly also at higher pressure within the hearth-forming lower sector of the rotary incinerator than within the roof-forming upper sector thereof.

The rotary incinerator and the method of operating it, suggested by the present invention, provide a considerably improved solution of the complex problem, associated with rotary incinerators for the purpose herein concerned, viz. the incineration of waste and refuse matter having a relatively high content of incombustible and difficulty combustible constituents of varying kinds, of obtaining a rapid and complete combustion of the combustible constituents of the refuse matter at an incinerator temperature which is sufficiently low to avoid sintering and troublesome caking and agglomeration of metallic and other mineral constituents of the refuse matter, of making the rapid and complete combustion possible with a minimum of excess air to keep the escaping amount of flue gases as low as possible, and of maintaining the refractory brick lining of the incinerator at as uniform a temperature as possible.

The above features of the invention and the advantages gained thereby will appear more clearly from the following description in which reference is made to the accompanying drawings in which:

FIG. 1 shows in a diagrammatic vertical section an embodiment of an incinerating installation comprising a precombustion furnace and a rotary incinerator connecting thereonto; and FIG. 2 on a larger scale shows a cross section on line II—II in FIG. 1 of the rotary incinerator in one embodiment of the invention.

The installation shown in FIG. 1 comprises a precombustion furnace 1 which is equipped with a step grate and in which the waste and refuse matter is subjected to predrying and the combustion of the readily inflammable constituents thereof is started, and a cylindrical rotary incinerator 2 connecting onto the precombustion furnace and receiving the refuse matter therefrom at one end, said incinerator 2 being mounted so as to rotate slowly in a conventional manner during operation. The precombustion of the waste and refuse matter is finished in said rotary incinerator 2, and the flue gases as well as the solid combustion residues are discharged through the other end of the incinerator to the chimney 3 and the ashpit 4, respectively. The shell 5 of the rotary incinerator is lined with refractory bricks 6 which, as will appear from FIG. 2, in a lower sector of the rotary incinerator form a hearth for the waste and refuse matter 7 and in an upper sector of the rotary furnace form a roof over the hearth and the burning matter thereon. The refractory bricks in substantially longitudinal brick layers, spaced mutual distances apart around the circumference of the incinerator project towards the centre of the incinerator past the other bricks of the lining and constitute internally in the incinerator on the one hand pushing ribs or blades 8 promoting the intermixture and revolution of the waste and refuse matter and on the other hand air supply nozzles adapted for preferably forced supply to the combustion chamber of both primary air through the hearth and secondary air through the roof. Each of the air passages 9 in the bricks constituting the pushing ribs or blades 8 and the air supply nozzles connects directly onto one air discharge hole 10 in the lined incinerator shell 5 which in the illustrated embodiments of the rotary incinerator is surrounded by an outer shell 11 partaking in the rotation of the incinerator, i.e., fixedly connected to the inner shell 5 to constitute shell interstices connected to means for forced supply of air, usually one or more fans. It is possible to arrange the fan or fans on the rotary incinerator so as to partake in the rotation thereof but it is preferred to dispose the fan or fans stationarily for supplying the air to the shell interstices of the rotary incinerator via one or more stationary air boxes 12 cooperating with the rotary incinerator. In the embodiment illustrated in FIG. 2, the interstices between the inner shell 5 and the outer shell 11 connected to the air box 12 preferably extending around the outer shell 11 is a continuous space around the inner shell 5, and the air discharge holes 10 in the inner shell 5 are controlled by valves associated with said holes in the interstice between the two shells 5 and 11 and having the form of flaps 13 pivotally mounted so as to swing outwards by gravity during the rotation of the incinerator keeping the air discharge holes 10 fully open within the hearth-forming lower sector of the rotary incinerator and so as to swing inwards incompletely closing the air discharge holes 10 within the roof-forming upper sector of the rotary incinerator to supply the secondary air through the incinerator roof at a lower pressure and in a smaller quantity than the primary air through the incinerator hearth.

The pushing ribs or blades 8 formed internally of the rotary incinerator by the refractory brick lining therein and the arrangement of the air passages 9 in said ribs or blades will provide—without any risk that these air passages may clog or solid particles may fall therethrough— a vigorous intermixture and revolution of the waste and refuse matter within the hearth-forming sector of the rotary incinerator to thereby promote the combustion of the matter on the hearth and make for a better exploitation of the primary air, and at the same time the supply of the secondary air, as described above and illustrated in FIG. 2 through the roof over the hearth and the burning matter thereon causes a vigorous turbulence of the secondary air and the still not fully burnt flue gases from the burning matter on the hearth, whereby the final combustion thereof is accelerated and the secondary air is better exploited for said final combustion. Simultaneously, the described supply of secondary air makes for an efficient utilization of the secondary air to discharge heat from the incinerator roof in the requisite manner to avoid that the radiation heat in the incinerator heats the incinerator roof to a temperature too much higher than that of the hearth covered by the burning refuse mater.

What I claim and desire to secure by Letters Patent is:

1. A rotary incinerator unit for waste and refuse matter of the type in which the incinerator unit is kept slowly rotating during operation and the refuse matter is fed into the incinerator unit at one end thereof while flue gases and solid combustion residues are discharged from the unit at the other end thereof; the rotary unit comprising, spaced inner and outer circumferential shells defining an air space therebetween, said inner shell having a refractory brick lining in the combustion chamber, the lower sector portions of the refractory brick lining constituting a hearth for the waste and refuse matter and the upper sections of the refractory brick lining constituting a roof over the hearth and the burning waste and refuse matter on the hearth, said refractory brick lining including a number of longitudinally extending brick layers distributed at spaced intervals around the refractory brick lining and projecting inwardly towards the center of the combustion chamber beyond the remaining bricks of the refractory brick lining, said longitudinally extending brick layers forming ribs for promoting the intermixture and revolution of the refuse matter on the hearth, a plurality of air supply passages formed in said ribs respectively and intercommunicating said air space between said shells with the combustion chamber for supplying air to the combustion chamber during rotation of the incinerator unit, and a plurality of flap valves pivoted in said space over said discharge passages respectively to move outwardly between open positions substantially opening the discharge passages when located in the lower sector of the incinerator unit and to move inwardly to partially close the air discharge passages when located in the upper sector of the incinerator unit.

2. The incinerator unit defined in claim 1 wherein said air space between said inner and outer shells extends continuously around the outer circumference of the inner shell.

References Cited
UNITED STATES PATENTS

| | | | |
|---|---|---|---|
| 775,693 | 11/1904 | Williams | 263—33 X |
| 2,238,161 | 4/1941 | Drew et al. | 110—14 |
| 2,724,780 | 3/1942 | Duerr et al. | 110—14 |

JAMES W. WESTHAVER, *Primary Examiner.*